United States Patent Office 2,792,333
Patented May 14, 1957

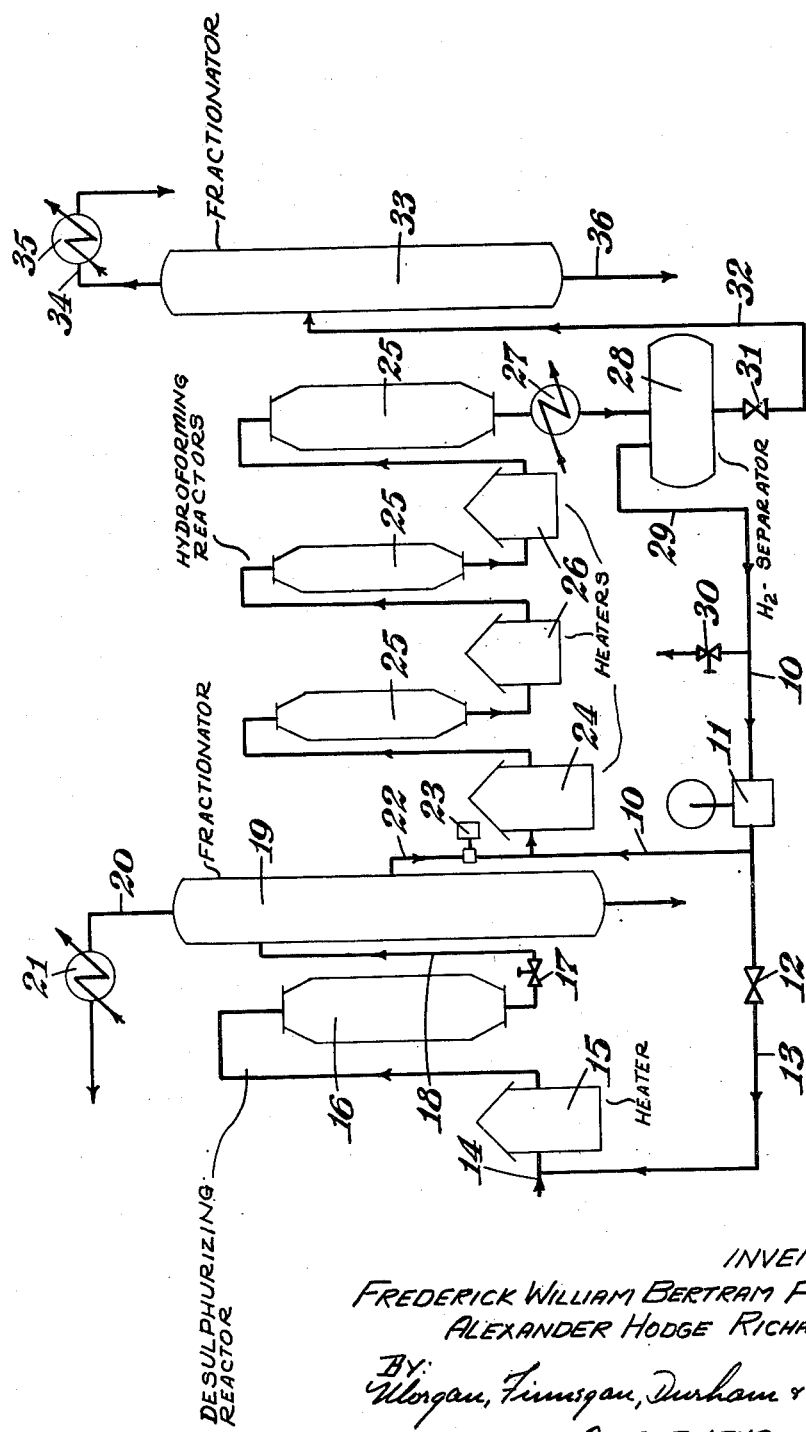

2,792,333

CATALYTIC HYDRO-REFORMING AND HYDRO-FINING OF PETROLEUM HYDROCARBONS

Frederick William Bertram Porter and Alexander Hodge Richardson, Sunbury-on-Thames, England, assignors to The British Petroleum Company Limited Application May 12, 1954, Serial No. 429,334

2 Claims. (Cl. 196—28)

This invention relates to the catalytic reforming of petroleum hydrocarbons and more particularly to the so-called hydroforming process in which a naphtha feedstock is contacted in known manner at elevated temperature and pressure in the presence of hydrogen with a dehydrogenation catalyst, such as molybdenum trioxide on alumina, or a platinum group metal and if desired a halogen, on alumina.

In the operation of the hydroforming process, there is a net production of a hydrogen-rich gas and the principal object of the present invention is to provide an improved process for the utilisation of this hydrogen-rich gas for the desulphurisation of petroleum hydrocarbons, in particular of the feedstock to the hydroforming process. There are many reasons why it is desirable to desulphurise the feedstock to a hydroforming process, the more important being the following.

(1) The need for a hydrogen sulphide-removal and drying system working at a high pressure is eliminated.

(2) Corrosion of the catalytic reforming equipment is reduced.

(3) Hydrogen make and yield/octane relationships are improved.

(4) The poisoning of sulphur-sensitive catalysts by sulphur compounds is eliminated with beneficial effects on catalyst life.

According to the present invention, a hydrogen-rich gas is withdrawn from the hydroforming process and is passed downwardly in admixture with a petroleum feedstock to be desulphurised in contact with a sulphur-resistant desulphurisation catalyst at elevated temperature and at a pressure sufficiently below the pressure in the hydroforming process to maintain the flow, the quantity of hydrogen-rich gas withdrawn from the hydroforming process being just sufficient to maintain a slight excess of hydrogen in the desulphurisation stage.

The desulphurisation stage is conducted at elevated temperature and in the presence of a sulphur-resistant hydrogenation catalyst in known manner. The temperature is preferably within the range 600–780° F. and the catalyst preferably is of the type comprising the oxides of cobalt and molybdenum incorporated with a support consisting essentially of alumina.

The process according to the invention is particularly applicable to the desulphurisation of the naphtha feedstock to the hydroforming process, and in this case the products from the desulphurisation stage may be reduced to atmospheric pressure without extraneous cooling and passed to a fractionator for the separation of hydrogen sulphide, water and other dissolved gases from the desulphurised naphtha feedstock.

One embodiment of the invention as applied to the desulphurisation of the naphtha feedstock to a hydroforming process will now be described with reference to the accompanying diagram.

The hydroforming process is operated with a hydrogen-rich recycle gas which in the diagram is circulated through the line 10 by the compressor 11. A small quantity of recycle gas is drawn off via the reducing valve 12 and line 13 and is admixed with the raw naphtha feedstock entering via line 14, the mixture being passed through the heater 15 into the desulphurisation reactor 16 wherein the mixture is passed downwardly over a sulphur-resistant desulphurisation catalyst, such as the oxides of cobalt and molybdenum on alumina, at a temperature of 600 to 780° F. The products from the reactor 16 are passed via reducing valve 17 and line 18 to the fractionating tower 19 from which hydrogen sulphide, water and other dissolved gas are removed overhead via line 20 and condenser 21. The desulphurised feedstock to the hydroforming process is removed as a side cut via line 22 and is passed via the pump 23 and heater 24 to the hydroforming system which comprises the reactors 25 and intermediate heaters 26. The products from the hydroforming process are passed via cooler 27, which may be a heat exchanger for the feedstock to the desulphurisation reaction, into a high pressure separator 28 from which a hydrogen-rich recycle gas is removed via line 29 and passed via line 10 and compressor 11 into admixture with the feedstock to the hydroforming system, excess gas being vented via valve 30. The liquid product from the separator 28 is passed via reducing valve 31 and line 32 to a stabilising column 33 from which gas is removed overhead via line 34 and condenser 35, stabilised reformate being removed via line 36 and passed to storage.

The operation of the desulphurisation stage may be carried out at a pressure just below that required for the hydroforming process in order to maintain flow. For high sulphur naphthas, a space velocity of 5.0 v./v./hr. may be employed but much higher space velocities may be employed for naphthas having a sulphur content below 0.1% weight. The product from the desulphurisation stage has a sulphur content of ca 0.001% weight.

A continuous two-stage process according to the present invention eliminates the necessity for a hydrogen sulphide-removal and drying system and may be carried out without the need for the extensive heating and cooling which would be required if a separate desulphurisation process were included. The desulphurisation stage is extremely simple and no gas recycle or cooling of the products for gas recycle is required. The consumption of hydrogen in the desulphurisation process is not greatly in excess of that required for sulphur removal and is compensated for by the increased hydrogen make in the hydroforming process.

The following is an example of the process of the invention as applied to the desulphurisation of the naphtha feedstock to a hydroforming process.

*Example*

A Middle East naphtha containing 0.120 percent weight sulphur was catalytically reformed over a platinum type catalyst under the following conditions:

Reactor pressure _____ 700 p. s. i. ga.
Reactor inlet temperature _____ 937° F.
Liquid feed charge rate _____ 1.9 volumes per volume of catalyst per hour.
Recycle gas rate _____ 8,700 s. c. f. per barrel of feed charge.

Under these conditions, a debutanised liquid product of research octane number 91.5 was obtained. The yield of liquid product was 80.9 percent weight of the feed charge, while the hydrogen production on processing was equivalent to 310 s. c. f. per barrel of feed charge.

The naphtha was then catalytically desulphurised prior to reforming under the following plant conditions:

| | |
|---|---|
| Catalyst | cobalt and molybdenum oxides on alumina support. |
| Reactor pressure | 600 p. s. i. ga. |
| Reactor inlet temperature | 650° F. |
| Liquid feed charge rate | 3.0 volumes per volume of catalyst per hour. |
| Hydrogen rich gas charge rate (ex Reformer) | 100 s. c. f. per barrel feed charge. |

The desulphurised product containing 0.003 percent weight sulphur was reformed using the same plant conditions given above for the untreated naphtha. A debutanised product of research octane number 91.5 was obtained. The yield of liquid product was 82.0 percent weight of the feed charge, while the hydrogen production was equivalent to 360 s. c. f. per barrel of feed charge.

We claim:

1. A process for the hydroforming of a petroleum naphtha which comprises passing a desulphurised naphtha to a hydroforming zone, wherein the naphtha is contacted at elevated temperature and pressure with a hydroforming catalyst comprising a platinum group metal supported on alumina, withdrawing a hydrogen-rich gas from the products of the hydroforming zone, passing said gas and an undesulphurized naphtha to a desulphurisation zone wherein said gas flows downwardly in admixture with the undesulphurised naphtha and in contact with a sulphur-resistant hydrogenation catalyst at an elevated temperature appreciably below the temperature in said hydroforming zone and at an elevated pressure sufficiently below the pressure in said hydroforming zone to maintain the flow in said desulphurisation zone, the quantity of hydrogen-rich gas withdrawn from the hydroforming zone being just sufficient to maintain a slight excess of hydrogen in the desulphurisation zone, reducing the products from the desulphurisation zone to atmospheric pressure without extraneous cooling, passing said products from said desulphurisation zone to a fractionating zone for the separation of hydrogen sulphide, water, and other dissolved gases, and the recovery of a desulphurised naphtha, venting said hydrogen sulphide, water, and other dissolved gases from the system, increasing the pressure on the recovered desulphurised naphtha to substantially the hydroforming pressure, passing the desulphurized naphtha to said hydroforming zone as the desulphurized naphtha first above mentioned, and passing the hydroformed product to a separation zone to remove the hydrogen therefrom.

2. A process for the hydroforming of a petroleum naphtha which comprises passing a desulphurised naphtha to a hydroforming zone, wherein the naphtha is contacted at elevated temperature and pressure with a hydroforming catalyst comprising a platinum group metal supported on alumina, withdrawing a hydrogen-rich gas from the products of the hydroforming zone, passing said gas and an undesulphurized naphtha to a desulphurisation zone wherein said gas flows downwardly in admixture with the undesulphurised naphtha and in contact with a sulphur-resistant hydrogenation catalyst at an elevated temperature within the range 600–780° F. and at an elevated pressure sufficiently below the pressure in said hydroforming zone to maintain the flow in said desulphurisation zone, the quantity of hydrogen-rich gas withdrawn from the hydroforming zone being just sufficient to maintain a slight excess of hydrogen in the desulphurisation zone, reducing the products from the desulphurisation zone to atmospheric pressure without extraneous cooling, passing said products from the desulphurisation zone to a fractionating zone for the separation of hydrogen sulphide, water, and other dissolved gases, and the recovery of a desulphurised naphtha, venting said hydrogen sulphide, water, and other dissolved gases from the system, increasing the pressure on the recovered desulphurized naphtha to substantially the hydroforming pressure, passing the desulphurized naphtha to said hydroforming zone as the desulphurized naphtha first above mentioned, and passing the hydroformed product to a separation zone to remove the hydrogen therefrom.

References Cited in the file of this patent
UNITED STATES PATENTS

| | | |
|---|---|---|
| 2,293,759 | Peniston | Aug. 25, 1942 |
| 2,361,008 | Buddrus et al. | Oct. 24, 1944 |
| 2,371,298 | Hudson et al. | Mar. 13, 1945 |
| 2,417,308 | Lee | Mar. 11, 1947 |
| 2,516,877 | Horne et al. | Aug. 1, 1950 |
| 2,671,754 | DeRossett et al. | Mar. 9, 1954 |
| 2,691,623 | Hartley | Oct. 12, 1954 |